US009813353B1

(12) United States Patent
Suit

(10) Patent No.: US 9,813,353 B1
(45) Date of Patent: Nov. 7, 2017

(54) MIGRATION OF FILES CONTAINED ON VIRTUAL STORAGE TO A CLOUD STORAGE INFRASTRUCTURE

(71) Applicant: Open Invention Network LLC, Durham, NC (US)

(72) Inventor: John Michael Suit, Mount Airy, MD (US)

(73) Assignee: Open Invention Network LLC, Durham, NC (US)

( * ) Notice: Subject to any disclaimer, the term of this patent is extended or adjusted under 35 U.S.C. 154(b) by 501 days.

(21) Appl. No.: 13/911,895

(22) Filed: Jun. 6, 2013

Related U.S. Application Data

(60) Provisional application No. 61/656,706, filed on Jun. 7, 2012.

(51) Int. Cl.
*G06F 15/16* (2006.01)
*H04L 12/911* (2013.01)

(52) U.S. Cl.
CPC .................................. *H04L 47/70* (2013.01)

(58) Field of Classification Search
CPC ............. G06F 9/5088; G06F 17/30233; H04L 67/1097; H04L 47/70
USPC ................................ 709/213, 214, 217, 219
See application file for complete search history.

(56) References Cited

U.S. PATENT DOCUMENTS

| 8,417,938 | B1* | 4/2013 | Considine | G06F 9/5088 713/151 |
| 8,495,323 | B1* | 7/2013 | Tatavarty | G06F 9/45558 711/164 |
| 2004/0133608 | A1* | 7/2004 | Saake | G06F 17/30221 |
| 2007/0055840 | A1* | 3/2007 | Yamamoto | G06F 3/0613 711/165 |
| 2012/0226689 | A1* | 9/2012 | Bolton | G06F 17/30522 707/736 |
| 2013/0110778 | A1* | 5/2013 | Taylor | G06F 17/30215 707/624 |
| 2013/0110967 | A1* | 5/2013 | Ueoka | G06F 11/1435 709/214 |
| 2014/0165063 | A1* | 6/2014 | Shiva | G06F 21/57 718/1 |

* cited by examiner

*Primary Examiner* — Viet Vu
(74) *Attorney, Agent, or Firm* — Haynes and Boone, LLP

(57) ABSTRACT

Disclosed are an apparatus and method of performing a data file migration to a cloud source. One example method of operation may include establishing via a transmitter an application programming interface (API) connection to an enterprise network, identifying via a processor one or more present allocation parameters being utilized by one or more virtual machines operating on the enterprise network. The method may also provide requesting via the transmitter a directory file structure and identifying via the processor at least one data file for data migration to a remote cloud storage server based on predetermined criteria.

20 Claims, 7 Drawing Sheets

MIGRATION OF FILES CONTAINED ON VIRTUAL STORAGE TO A CLOUD STORAGE INFRASTRUCTURE

CROSS-REFERENCE TO RELATED APPLICATIONS

This application claims priority to an earlier filed provisional application No. 61/656,706 entitled "SYSTEM AND METHOD FOR MIGRATION OF FILES CONTAINED ON VIRTUAL STORAGE TO A CLOUD STORAGE INFRASTRUCTURE", filed on Jun. 7, 2012, the entire contents of which are hereby incorporated by reference in its entirety.

TECHNICAL FIELD OF THE APPLICATION

This application relates to a method and apparatus of file system analysis, and in particular, to methods and apparatuses for performing automatic determining of the usage of files stored in a virtual storage volume and the migration of those files to a cloud storage infrastructure.

BACKGROUND OF THE APPLICATION

Conventionally, cloud computing is an outsourced and often remote enterprise related function that does not easily integrate into the working models of a computing platform, network or other enterprise configuration.

Currently, traditional enterprise networks may include various nodes that contribute to an overall business process. The network nodes may include both physical and cloud based machines. Enterprise networks may include cloud computing machines and physical hosts, which are required to provide an allocation of resources.

Enterprise networks may also include cloud resources/machines and physical host devices which are required to provide an allocation of resources. Physical hosts may include hardware devices that provide certain services, such as physical storage, which may be converted to cloud storage and allocated to corresponding cloud machines or cloud spaces (e.g., virtual cloud machines) depending on the anticipated requirements of an observed use of such cloud functions. The balance between actual physical storage and physical processing and allocated cloud storage and cloud processing usage may be optimized by monitoring and identifying the activities and functions performed in the enterprise network environment.

Conventionally, enterprise managers have had to choose which files they would consider migrating to a cloud infrastructure. The files are most often utilized by applications within a virtual infrastructure. Those files often work in concert with several other files used to perform a business process or function, and thus a combination of different files to be migrated is common in cloud migration procedures. The process of actually migrating the files results in the path changing for the files being migrated. In order to attain the benefit of public and private clouds, the application and or processes that request the files requires each and every requestor be updated with the new path within the cloud storage infrastructure. Modifying the path for each of these requestors is inefficient. The process may be manually achieved by the Enterprise manager and/or the application developer who must take into account the new cloud migration path. A need exists to automate aspects of this process, to permit efficiency and so enterprise managers and application developers can take advantage of an elastic cloud storage environment.

SUMMARY OF THE APPLICATION

One embodiment of the present application may include a method of establishing via a transmitter an application programming interface (API) connection to an enterprise network, and identifying via a processor at least one present allocation parameter being utilized by at least one virtual machine operating on the enterprise network. The method may also include requesting via the transmitter a directory file structure and identifying via the processor at least one data file for data migration to a remote cloud storage server based on predetermined criteria.

Another example embodiment of the present application may include an apparatus that provides a transmitter configured to transmit and establish an application programming interface (API) to an enterprise network and a processor configured to identify at least one present allocation parameter being utilized by at least one virtual machine operating on the enterprise network. The transmitter is configured to transmit a request for a directory file structure and the processor is configured to identify at least one data file for data migration to a remote cloud storage server based on predetermined criteria.

DETAILED DESCRIPTION OF THE APPLICATION

Figure 1:
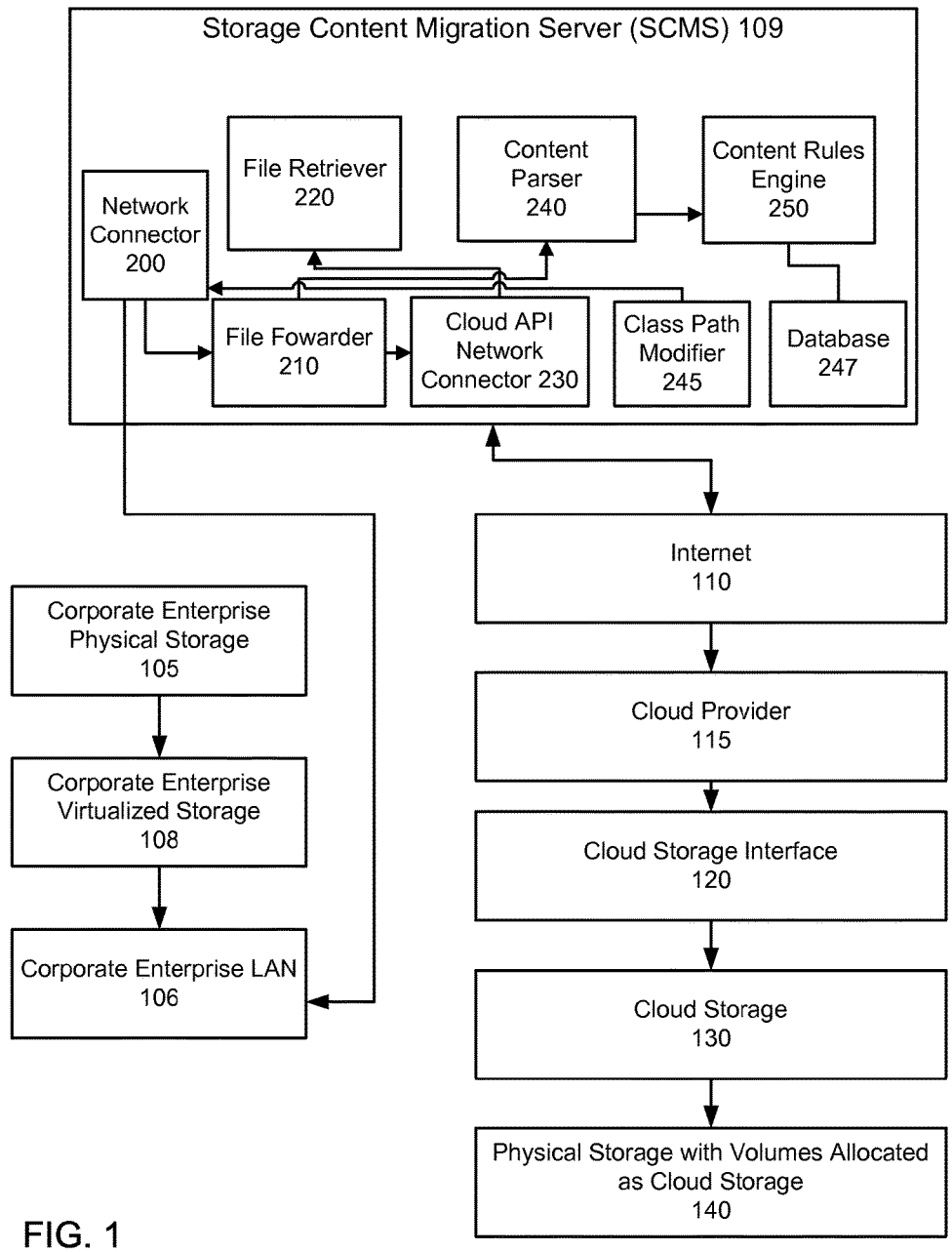
FIG. 1 illustrates an example network system of an enterprise application cloud migration procedure according to example embodiments of the present application.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Specific exemplary embodiments of the application will now be described with reference to the accompanying drawings. This application may, however, be embodied in many different forms, and should not be construed as limited to the embodiments set forth herein. Rather, these embodiments are provided so that this disclosure will be thorough and complete, and will fully convey the scope of the application to those skilled in the art.

It should be understood that when an element is referred to as being "connected" or "coupled" to another element, it can be directly connected or coupled to the other element, and/or intervening elements may be present as well. Furthermore, "connected" or "coupled" as used herein may include wirelessly connected or coupled. It will be understood that although the terms "first" and "second" are used herein to describe various elements, these elements should not be limited by these terms. These terms are used only to distinguish one element from another element. Thus, for example, a first user terminal could be termed a second user terminal, and similarly, a second user terminal may be termed a first user terminal without departing from the teachings of the present application. As used herein, the term "and/or" includes any and all combinations of one or more of the associated listed items. The symbol "/" is also used as a shorthand notation for "and/or".

FIG. 1 illustrates an example logic diagram of an enterprise and cloud network integration model 100. Modern enterprise networks are designed for client/server computing, as well as peer-to-peer communication. A host computing machine may attach itself to a modern enterprise network and establish itself on the enterprise utilizing a non-authenticated physical connection. The application utilized to function on the enterprise network may include several architectural elements as described below. For example, as illustrated in FIG. 1, the integration model provides a storage content migration server (SCMS) 109, a corporate physical storage 105, a corporate enterprise virtualized storage 108, an enterprise LAN 106, the Internet 110, a cloud provider 115, a cloud storage interface 120 (i.e., WDSL-API), a cloud storage 130, and a physical storage with volumes allocated as the cloud storage 140.

Within the storage content migration server SCMS 109 there are several sub-elements used in accordance with enterprise and cloud migration efforts. The enterprise network connector 200, file retriever 220, content parser 240, content rules engine 250, file forwarder 210, cloud API network connector 230, class path modifier 245, and the database 247. The application operates within an enterprise where virtual machines are present and often submit file request messages for files to be retrieved for the normal course of their intended function. This includes a virtual machine that resides on a hypervisor client or otherwise referred to as a host. The physical computer that is running the hypervisor software and/or application to host a virtual machine (VM) does not generally have knowledge of how the virtual machine being hosting is performing against a particular task or an intended purpose. As a result, the VM cannot therefore determine an optimum or efficient configuration for that VM.

A virtual machine (VM) may be an isolated guest operating system installation within a normal host operating system. Virtual machines are implemented with either software emulation or hardware virtualization or both together. For the purposes of this application both type-1 and type-2 hypervisors may be used to host VMs that contain applications that suffice as "requestors". Type-1 or native hypervisors run directly on the host's hardware to control the hardware and to manage guest operating systems. A guest operating system will operate on another level above the hypervisor. This model represents the classic implementation of virtual machine architecture, a modern equivalent of this type of hypervisor is the Citrix XenServer, VMware ESX/ESXi, and Microsoft Hyper-V hypervisor.

In another example, the type-2 or hosted hypervisors run within a conventional operating system environment with the hypervisor layer as a distinct second software level, and guest operating systems operate at the third level above the hardware. KVM and VirtualBox are examples of type-2 hypervisors. Type-1 hypervisors operate directly on the hardware, and a type-2 hypervisor operates on another operating system, such as FREEBSD or LINUX.

The VMs that have applications are considered "requestors". A hypervisor, also called a virtual machine manager (VMM), is one of many hardware virtualization techniques allowing multiple operating systems (i.e., "guests"), to run concurrently on a host computer. It is called a hypervisor because it is conceptually one level higher than a supervisory program. The hypervisor presents to the guest operating systems a virtual operating platform and manages the execution of the guest operating systems. Multiple instances of a variety of operating systems may share the virtualized hardware resources. Hypervisors are very commonly installed on server hardware, with the function of running guest operating systems, that themselves act as servers.

According to an example method of operation, the SCMS 109 of FIG. 1 collects data from the virtual infrastructure management provider by establishing an API connection to the virtual infrastructure management console. The information contained in a typical virtual infrastructure provider's API is includes virtual machines and virtual storage that the VMs are utilizing, and the virtual network components. For each virtual machine, the APIs (VIX and WMI) will identify and generate a report message for the allocation for each virtual machine. The allocation may include, memory usage, storage usage, network device, central processing unit (CPU), etc. Examples for the allocation may include: "Memory 4 Gigabytes", "Storage 100 Gigabytes", "Network Device VMware Network TCP/IP adapter." The VIX API will return the current allocation utilized by the virtual machine for each of the identified allocations.

The attributes identified and considered prior to any cloud migration of the VM allocations may include memory usage and capacity, storage usage and capacity, network device, CPU usage, etc. The attributes may be used as a basis for selecting those VMs that can migrate their dependent files currently in the virtual storage allocation to cloud storage. The content engine 250 is capable of discerning the activity level of each VM and the less used the VM the higher ranking it becomes for a migration effort. For example, the most commonly used VM may be a poor candidate for migration and may have a ranking of 1 or 2 out of a possible 10. The least used VMs may be identified by a continuously incremented numerical value, such as every 24 hours it is not used the increment adds one and every time the VM is used, accessed, etc., the increment may subtract one to the score with a maximum score of a possible 10. The higher the score the less that the VM is used.

Beyond the allocated items, the use of another API, such as WMI may be required. It is the virtual storage portion that the application utilizes to connect to the virtual storage in the Enterprise to begin the process. The VIX API is a library for writing scripts and programs to manipulate virtual machines. The VIX API operates on a Microsoft Windows® (Windows XP, Windows Server 2003, or later) and Linux platforms.

An example of what the API would return for virtualized physical storage is:
fc.5001438005685fb7:5001438005685fb6-
fc.5006048c536915af:5006048c536915af-
naa.60060480002903010145330303130
UID: fc.5001438005685fb7:5001438005685fb6-
fc.5006048c536915af:5006048c536915af-
naa.60060480002903010145330303130
   Runtime Name: vmhba1:C0:T0:L0
   Device: naa.60060480002903010145330303130
   Device Display Name: EMC Fibre Channel Disk (naa.60060480002903010145330303130)
   Adapter: vmhba1
   Channel: 0
   Target: 0
   LUN: 0
   Plugin: NMP
   State: active
   Transport: fc
   Adapter Identifier: fc.5001438005685fb7:5001438005685fb6
   Target Identifier: fc.5006048c536915af:5006048c536915af
   Adapter Transport Details: WWNN: 50:01:43:80:05:68:5f:b7
WWPN: 50:01:43:80:05:68:5f:b6
   Target Transport Details: WWNN: 50:06:04:8c:53:69:15:af WWPN: 50:06:04:8c:53:69:15:af.

From this data, the file parser interrogates the virtual storage for a directory file structure. In order to gain this information for a given virtual storage LUN in a VMware environment utilizing the CIM API, the file parser would utilize the following—for example:

```
#include <Pegasus/Common/Config.h>
#include <Pegasus/Client/CIMClient.h>
#include <iostream>
using namespace Pegasus;
using namespace std;
const String NAMESPACE="vmware/esxv2";
const int PORT=5988;
CIMInstance GetESXServerObject(const CIMClient &client);
Array<CIMObject> GetLuns(const CIMClient &client, const CIMObject &theESXInstance);
void PrintESXServerInfo(const CIMObject &theESXInstance);
void PrintLUNInfo(const CIMObject &theLUNObject);
int main(int argc, char *argv[ ]) {
if (argc !=4) {
cerr <<"Usage:"<<argv[0] <<"<hostname><user><password>" <<endl;
return (1);
}
// Establish a client-side connection object.
CIMClient client;
// Connect to the CIMOM.
try {
// hostname, port, user, password
client.connect(argv[1], PORT, argv[2], argv[3]);
} catch (Exception &e) {
cerr <<"Error: Unable to connect:"<<e.getMessage( )<<endl;
return (1);
}
try {
// Get ESXComputerSystem object.
CIMInstance esx=GetESXServerObject(client);
// Print info about ESX/ESXi host.
PrintESXServerInfo(esx);
// Get LUN list.
Array<CIMObject> luns=GetLuns(client, esx);
// Print info about LUNs.
for (int i=0; i<luns.size( ) i++) {
PrintLUNInfo(luns[i]);
}
} catch (Exception &e) {
cerr <<"Error: CIM access failed:"<<e.getMessage( )<<endl;
return (1);
}
return (0);
}
CIMInstance GetESXServerObject(const CIMClient &client) {
Array<CIMInstance> esxcs;
esxcs=client.enumerateInstances(NAMESPACE, "VMWARE_ESXComputerSystem");
// Can only get 1 ESXComputerSystem from each connection. CIMInstance theESXInstance=esxcs[0];
return (theESXInstance).
```

The user may configure the content rules engine within the SCMS to only consider files on specific virtual storage volumes. The storage volumes are created by allocating storage to be virtualized from enterprise physical storage. It is then determined as to whether the user restricted the virtualization volumes from being analyzed by the content rules engine 250, and if so then the user device may select which volumes and paths not to include for the parser engine 240. The directory file structure may offer information, such as last accessed date, last modified date, last creation date, etc. This provides helpful information used to determine whether files should be migrated.

Volumes are organized by logical unit numbers (LUNS) in a computer storage, a logical unit number or LUN is a number used to identify a logical unit, which is a device addressed by the SCSI protocol or similar protocols such as fiber channel or iSCSI. A LUN may be used with any device which supports read/write operations, such as a tape drive, but is most often used to refer to a logical disk as created on a SAN. Though not technically correct, the term "LUN" is often also used to refer to the drive itself.

An Example of volume and paths is shown in TABLE 1 below:

TABLE 1

| Volume ### | Ltr | Label | Fs | Type | Size | Status |
|---|---|---|---|---|---|---|
| Volume 0 | D | 090809_2201 | UDF | DVD-ROM | 2081 MB | Healthy |
| Volume 1 | | System Rese | NTFS | Partition | 100 MB | Healthy |
| Volume 2 | C | | NTFS | Partition | 297 GB | Healthy |
| Volume 3 | E | FreeAgent | NTFS | Partition | 465 GB | Healthy. |

For volumes and paths within a directory listing, the "path" and "listdir" API calls may be used. The following API Calls are Valid for DANGO storage as an example implementation. The storage class provides a standardized API for storing files, along with a set of default behaviors that all other storage systems can inherit or override as necessary.

It is then determined as to whether the user restricted the virtualization volumes from being analyzed by the content rules engine 250, and if not, then the sequence continues with the user device confirming the list assembled by the content rules engine 250 is correct, and executes a file migration to the cloud. This is accomplished by the file being forwarded after the file restrictions have been detected. The virtual storage volume of the enterprise 108 and the inventory in the database 247 are updated by the SCMS 109 with a list of volumes for the content parser 240 to inspect.

The content parser 240 identifies volumes with directory attributes and parses for the "last modified" field to assemble a list of candidate files to be migrated to cloud storage. The list gathered by the parser engine is then added to the database. The content rules engine routinely gathers the file list from the database based on a user definable interval (e.g., 30 minutes, twice a day, once a day, once a week, etc.). The content rules engine 250 then determines if the files are within the prescribed range or not. For example, if a file has not been modified or accessed for more than 30 days it would be considered a candidate for migration. Files that are ultimately migrated must be located by the virtual infrastructure in a manner that permits them to be located in their new location without having to modify all of the hardcoded file location that exists in the application that require access to them on a regular basis.

Data volumes that are not commonly used may include archival data structures that are utilized by a VM infrequently but are still routinely accessed are ideal candidates for migration to the cloud storage. In one example, data volumes that contain a virtual memory block type of storage as a substitute for physical read only memory (ROM) would be bad candidates for migration since their memory is borrowed, virtual and more difficult to ascertain as a source of information. Once a file is migrated, a class path modifier may be used to create an enterprise redirect to the cloud storage, such as a proxy for the original path in the directory structure. So when that migrated data file is accessed the new class path created by the class path modifier may be stored in a common class file access directory and used to identify, retrieve and access the data file remotely seamlessly and without delay.

The classpath modifier 245 within the SCMS 109 creates and configures a "broker" to accomplish this task. The class path modified provides an alternate location to the requestor seeking access to the file contained in a virtual storage volume (i.e., redirect). The class path broker mimics the behavior of adding a new path to the environmental variables "class path" within an individual operating system. The class path broker provides an alternate path for files contained in the virtual storage volumes. The class path modifier 245 adds a volume\path alternate entry for each file that is migrated. In operation, when a virtual machine requests a file to be retrieved from a virtualization storage volume, the class path broker will provide an alternate path to the file retriever 220 and the SCMS 109 will retrieve the file and create a temporary path within the virtual storage device and insert the file accordingly so the file can be retrieved by the requestor. This process permits the file to be available to the requestor without having to modify the path of a would be requestor. Once the file has been accessed by the requestor, the file forwarder dissolves (e.g., deletes, removes, relocates, etc.) the file, and with this operations the sequence then ends.

In an alternative use example, if the enterprise or cloud administrator is attempting to retrieve the files that have been migrated then the user may retrieve or re-establish any migrated file back to the virtualization storage device by selecting any or all files for retrieval. This is accomplished by the file retriever 220. The database contains a list of all migrated files and their original volume\path structures. The file retriever 220 requests these attributes from the database 247. As a result, the file retriever 220 requests the files from the cloud storage API, and inserts those files with their original volume and path attributes back to the virtual storage volume, and with that operation the sequence ends.

Figure 2:
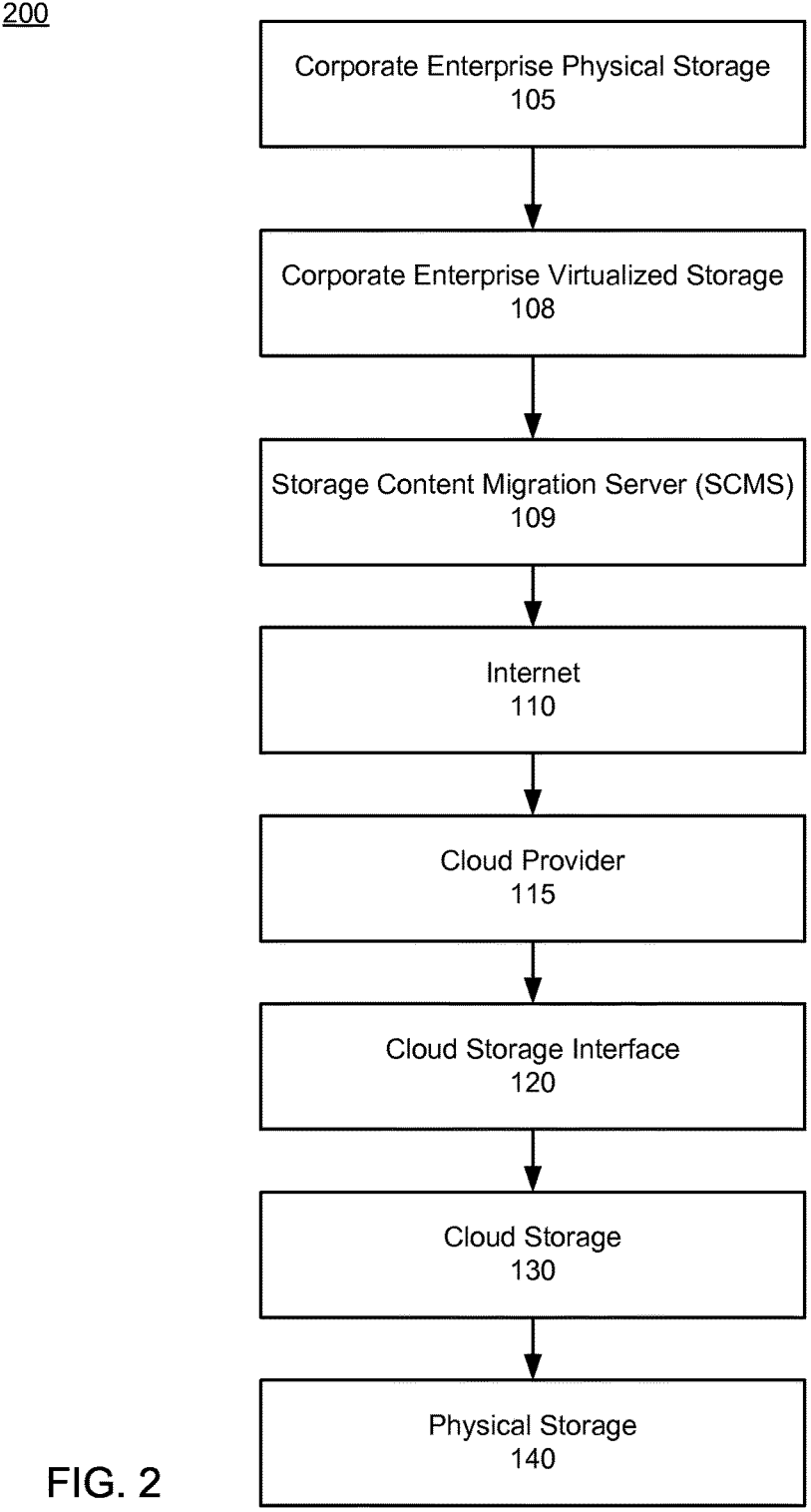
FIG. 2 illustrates an example network architecture of cloud instances according to example embodiments of the present application.

FIG. 2 illustrates a logic diagram of the entities and/or logical processing units associated with a data file migration. Referring to FIG. 2, the flow diagram 200 illustrates the progressive flow of devices, entities, networks and applications that are likely to be utilized during a file migration procedure. For example, the data files that are candidates for data file migration are part of the corporate enterprise physical storage 105. Within the architecture of the physical memory are various virtual memory storage locations utilize by virtual machine engines, applications and similar programs and operations. The defined virtual drives, databases, allocated memory, etc. in the virtualized storage 108 may be used to reference, locate and identify the types of data files to migrate by their corresponding logical memory locations, paths, etc.

In operation, the storage content migration server (SCMS) 109 may be responsible for accepting invitations or requests for file migration and identifying file locations, and file candidates for the migration. The Internet 100 is a likely candidate for migrating the data files selected to be migrated from an internal enterprise data file storage system to a remote server farm, cloud or other third party data storage source. The cloud provider 115 defines the third party source and may be any of the large server storage providers located around the globe. The cloud storage interface 120 is an application programming interface, application or other integrated configuration used to address the need for file migration. The cloud storage as described above 130 may be a combination of physical and virtual devices 140 that operate to provide an outsourced file storage facility.

Figure 3:
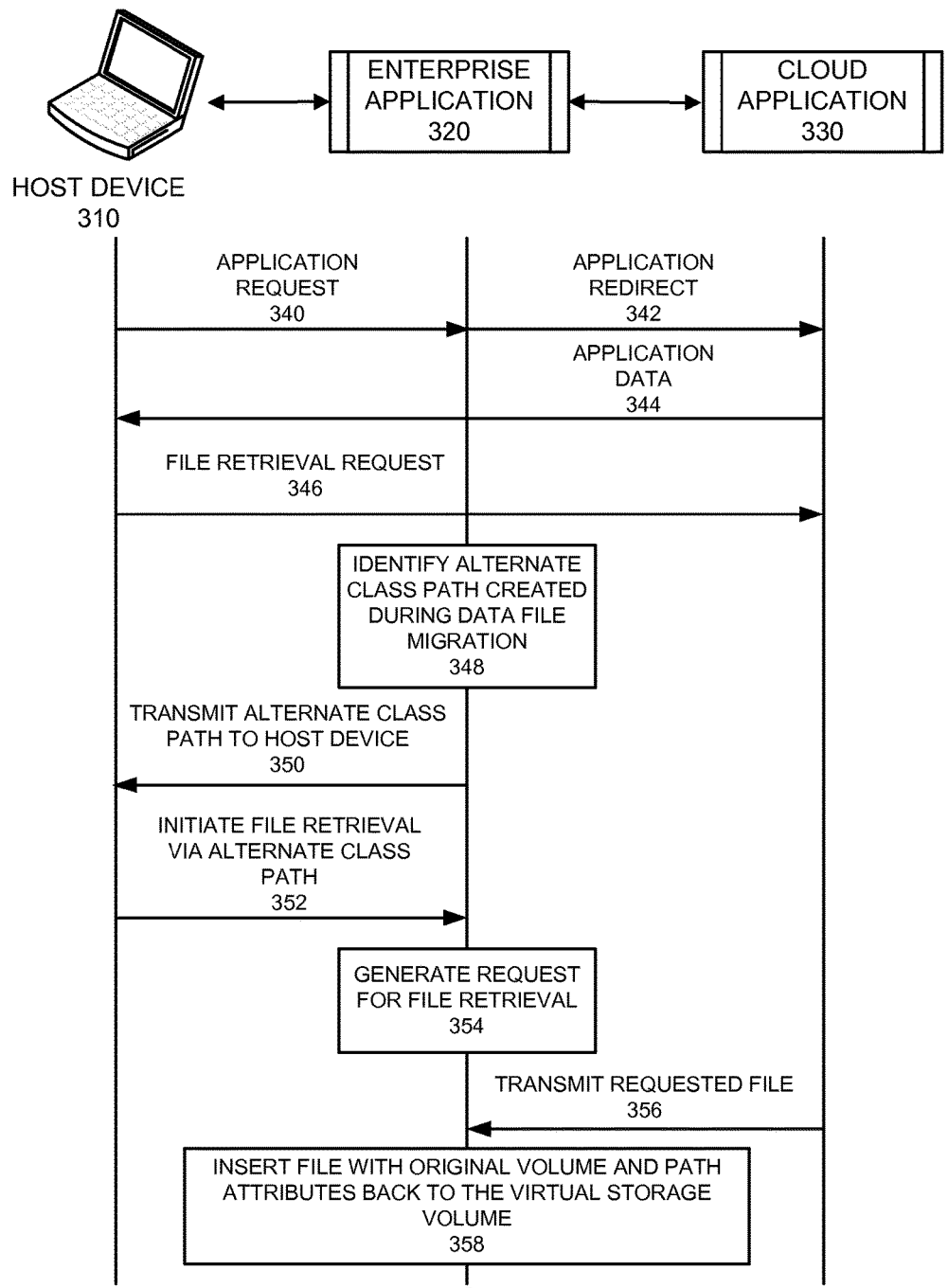
FIG. 3 illustrates an example system signaling communication model of data file retrieval from a cloud storage application according to example embodiments of the present application.

FIG. 3 illustrates a communication network message flow system diagram according to example embodiments. Referring to FIG. 3, the communication signaling diagram 300 provides an example of a user device or host device 310 operating within the enterprise network and which is attempting to access one or more data files that have since been migrated from the enterprise network to a remote cloud source. The host device 310 may initiate communication with a database, server or enterprise application 320 via an application request 340 for a data file. The application request may be redirected 342 to the cloud source or application 330 so the file may be located. Next, the application data 344, such as setup, authorization, etc., may be communicated so the host device 310 is configured to access the data file. The file retrieval request may include the file or files by name or other reference parameter to be retrieved from the cloud 330. The enterprise application 320 may identify an alternate class path created during the data file migration 348. The class path may be referenced and linked 350 to a file retrieval operation 352 initiated by the host device 310. Now the enterprise application 320 may be able to communicate with the cloud application 330 by referencing the correct file retrieval path via a modified request 354. The cloud application can now respond promptly by transmitted the requested file 356 which is then linked to the original volume and path attributes 358 known by the host device 300. The host device may observe a familiar file access setting without having to operate within a different file access system.

Figure 4A:
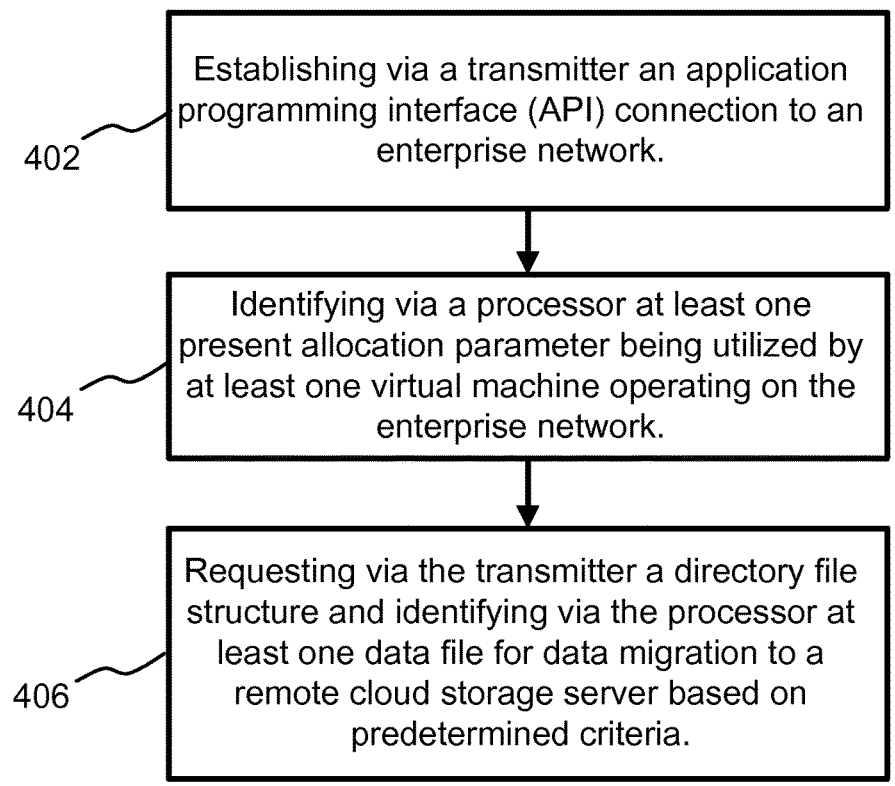
FIGS. 4A and 4B illustrate flow diagrams of example methods of operation according to an example embodiment of the present application.
Figure 4B:
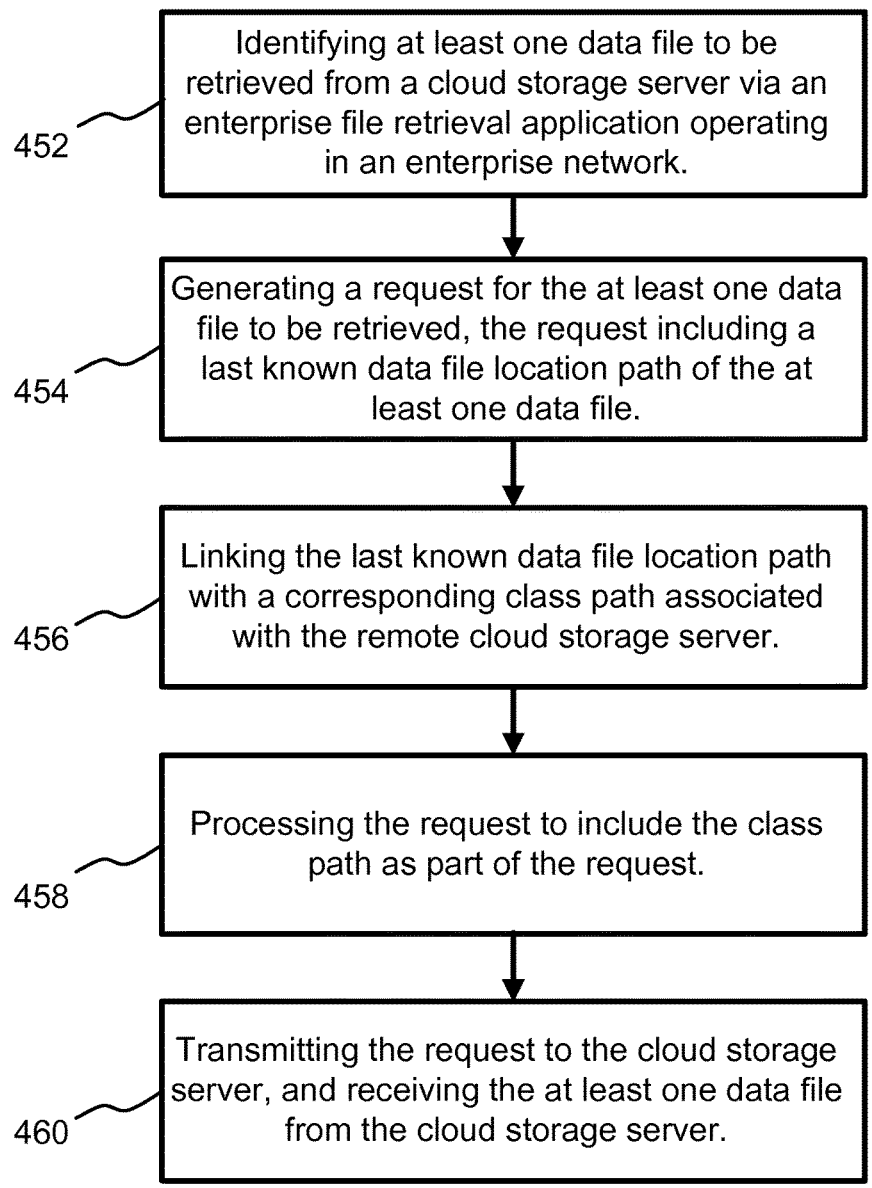

FIGS. 4A and 4B are flow diagrams 400 and 450 of example methods of operation. FIG. 4A illustrates an example method of performing data file migration to the cloud and FIG. 4B is a file retrieval example method of operation. Referring to FIG. 4A, the flow diagram 400 provides establishing an application programming interface (API) connection from a storage content migration server to an enterprise network via operation 402 and identifying at least one present allocation parameter being utilized by at least one virtual machine operating on the enterprise network at operation 404. The method may also provide requesting a directory file structure and identifying at least one data file for data migration to a remote cloud storage server based on predetermined criteria at operation 406. The attributes identified and current operating conditions of the virtual machines may provide a basis for the specific data files that are candidates for data migration. Referring to FIG. 4B, the example method 450 may include identifying at least one data file to be retrieved from a cloud storage server via an enterprise file retrieval application operating in an enterprise network at operation 452 generating a request for the at least one data file to be retrieved, the request including a last known data file location path of the at least one data file, at operation 454, linking the last known data file location path with a corresponding class path associated with the remote cloud storage server at operation 456, processing the request to include the class path as part of the request at operation 458 and transmitting the request to the cloud storage server and receiving the at least one data file from the cloud storage server at operation 460.

Figure 5:
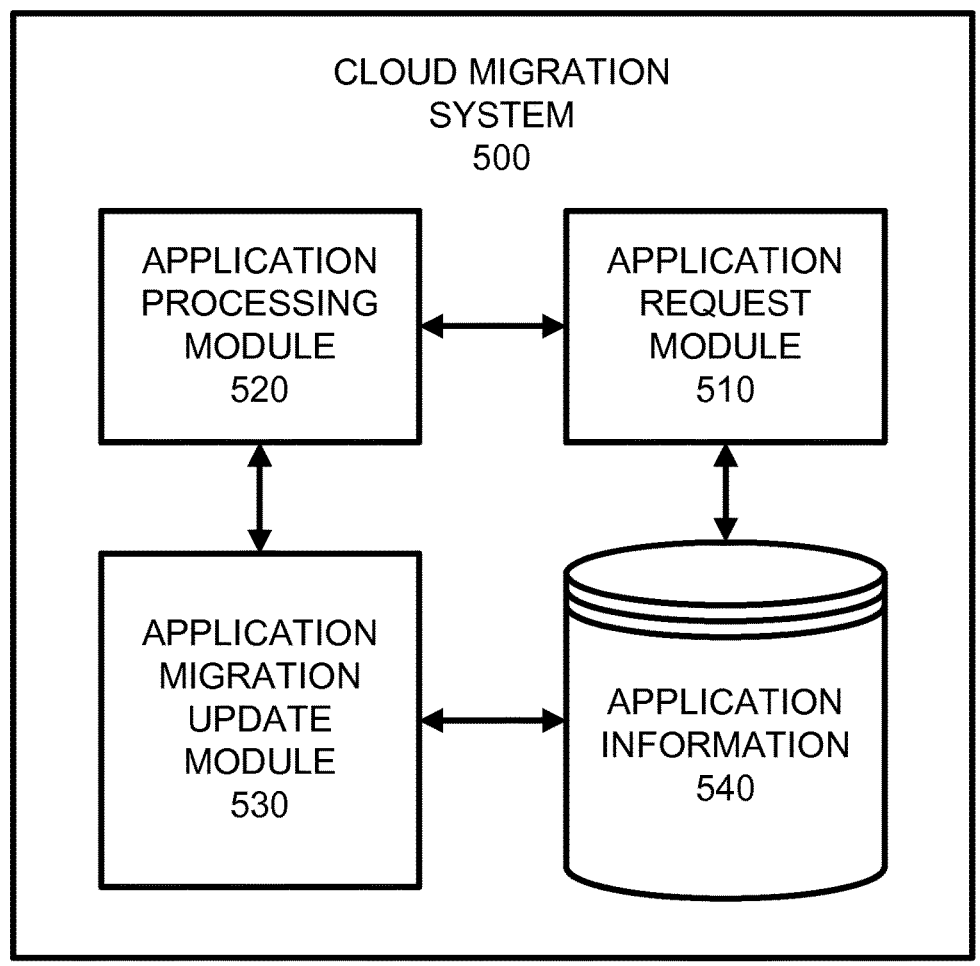
FIG. 5 illustrates a system configuration that is configured to perform one or more operations corresponding to the example embodiments.

FIG. 5 is a system diagram of an example system configured to perform one or more operations associated with the example embodiments. Referring to FIG. 5, the system 500 may perform various operations, methods and/or procedures according to the example embodiments. One example method may include establishing an application programming interface (API) connection from a storage content migration server to an enterprise network via the application request module 510. The application processing module 520 may then perform identifying at least one present allocation parameter being utilized by at least one virtual machine operating on the enterprise network to identify candidate data files for migration. The migration module 520 may then perform requesting a directory file structure and identifying at least one data file for data migration to a remote cloud storage server based on predetermined criteria such as whether the virtual storage volume is accessible, restricted or designated for migration. The file may be located in a central database 540 operating within the constraints of the enterprise or via a known enterprise location.

In general, the data file(s) to be migrated may be physically stored in the enterprise network prior to selection or migration efforts. The present allocation parameter used to identify a VM or its corresponding data file affiliations may include a memory usage, a storage usage, a network device usage and a central processing unit (CPU) usage of any of the VMs operating within the data file system or the enterprise network. In one example, the predetermined criteria may include a predefined virtual storage volume and the data file considered for migration is stored within the predefined virtual storage volume which may be marked as available, inaccessible, private, public, etc., depending on the status of the data files or the virtual storage volume. During the data file migration process, the cloud migration system 500 may also include determining whether the predefined virtual storage volumes are restricted from being analyzed, and if so, then the restricted storage volumes and corresponding paths are omitted from migration consideration. Restricted data may be high-use data files, private and/or highly sensitive materials, etc. If however, the predefined virtual storage volumes are not restricted from being analyzed then the storage volumes may be identified as reasonable candidates and may be migrated to the cloud storage server. The method may also include identifying a change in data file inventory and generating a file list of potential candidate files for the data migration to the cloud server and storing the file list in the database periodically. The list will generally be dynamic and will update accordingly. The method may also include accessing the file list to consider additional data files to migrate to the cloud storage server on a periodic basis.

According to another example embodiment, the system 500 may provide a process of data file retrieval that complements the data file migration process. One example method of operation may include identifying at least one data file to be retrieved from a cloud storage server via an enterprise file retrieval application operating in an enterprise network. The device in the enterprise network may be a user computer or administrator device that is setup to retrieve one or more data files from the cloud server storage. The method may also include generating a request for the at least one data file to be retrieved including a last known data file location path of the at least one data file. The last known data file location may be the original enterprise data file storage location, data file storage volume, virtual storage volume, and/or original volume/path and corresponding attributes. The last known data file location path may be linked with a corresponding class path associated with the remote cloud storage server. The method may also provide processing the request to include the class path as part of the request via the processing module 520 and transmitting the request to the cloud storage server via the migration update module 530. As a result, the at least one data file may be received from the cloud storage server.

The system 500 may also provide reestablishing the at least one data file with the last known data file location path, and presenting the data file to a requesting entity. The method may also include accessing a virtual storage volume to identify the at least one data file and receiving the class path linked to the remote cloud storage server responsive to the accessing of the virtual storage volume. The class path may be a cloud server specific path that has no relationship with the original file directory or location but which is necessary to locate the file on the cloud server. The method may further include migrating a plurality of data files including the at least one data file from the enterprise network to the cloud storage server and creating an alternate entry path for each migrated data file. Data files may be migrated periodically and can be updated according to an audit procedure of updated list of files that are acceptable for migration. The method may also include receiving a request for the at least one data file and responsive to receiving the request, retrieving the at least one data file and creating a temporary access path to the at least one data file within a virtual storage device. The temporary access path may be a path that is recognizable to the requestor's operating system but which is not used by the cloud server of the enterprise network normally. Once the temporary file location is setup, the method may provide receiving an access request for the at least one data file at the temporary access path, and deleting the at least one data file after the file has been accessed at the temporary access path. This effectively removes the temporary access path from future use until another file retrieval operation is necessary. The method may also include requesting a list of data files that have been migrated to the cloud storage server and reestablishing all of the data files in original data volumes and original path attributes previously associated with the migrated data files.

The user or host device may be a computer, laptop, mobile, wireless or cellular phone, a PDA, a tablet, a client a server or any device that contains a processor and/or memory, whether that processor or memory performs a function related to an embodiment of the application.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 6 illustrates an example network element 600, which may represent any of the above-described network components 102 and 103, etc.

Figure 6:
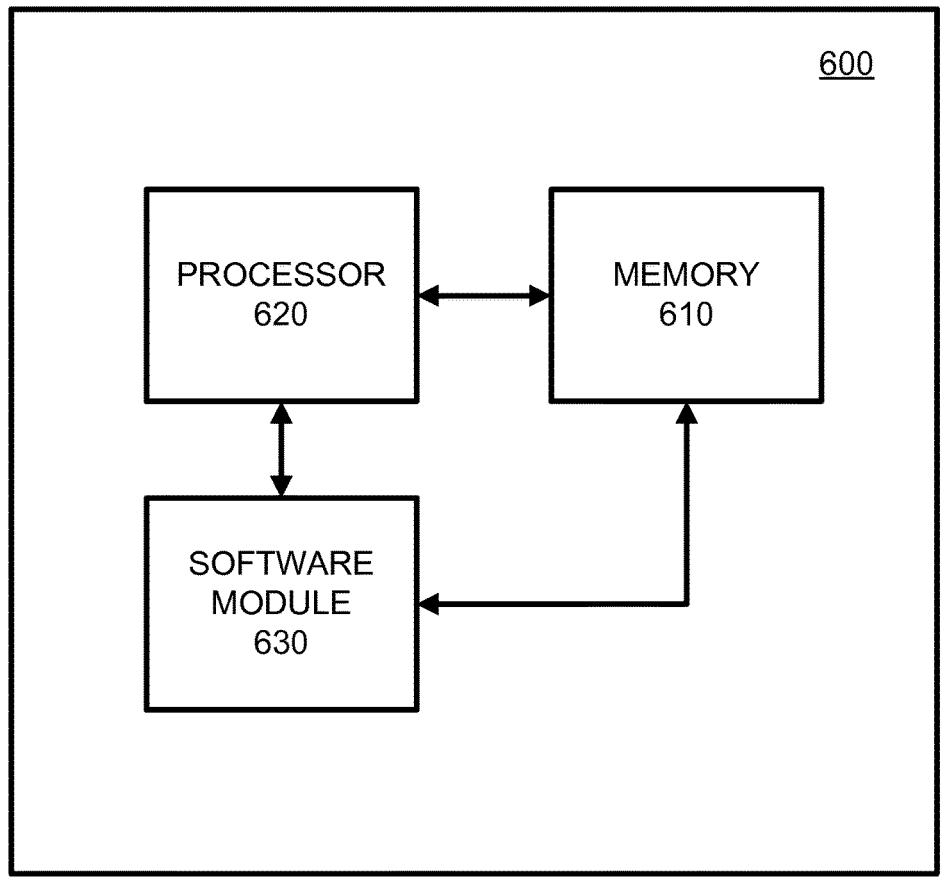
FIG. 6 illustrates an example network entity device configured to store instructions, software, and corresponding hardware for executing the same, according to example embodiments of the present application.

As illustrated in FIG. 6, a memory 610 and a processor 620 may be discrete components of the network entity 600 that are used to execute an application or set of operations. The application may be coded in software in a computer language understood by the processor 620, and stored in a computer readable medium, such as, the memory 610. The computer readable medium may be a non-transitory computer readable medium that includes tangible hardware components in addition to software stored in memory. Furthermore, a software module 630 may be another discrete entity that is part of the network entity 600, and which contains software instructions that may be executed by the processor 620. In addition to the above noted components of the network entity 600, the network entity 600 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of FIG. 5 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   establishing via a transmitter an application programming interface (API) connection to an enterprise network;
   identifying via a processor at least one present allocation parameter being utilized by at least one virtual machine operating on the enterprise network; and
   requesting via the transmitter a directory file structure of the enterprise network, determining whether predefined virtual storage volumes are restricted from being analyzed, and identifying via the processor at least one data file physically stored in the directory file structure and included within at least one predefined virtual storage volume for data migration to a remote cloud storage server based on predetermined criteria wherein the predetermined criteria is a present status of the predefined virtual storage volume,
   wherein the processor causes a classpath modifier component to configure a classpath broker to add a new path to a classpath environmental variable identifying location of the at least one data file after migration,
   wherein when retrieval of the at least one migrated data file is requested, the processor inserts the file into a temporary path created within virtual storage;
   wherein a file list of potential candidate files is generated for the data migration to the cloud server and storing the file list in the database; and
   wherein the file list is accessed and additional data files to migrate to the cloud storage server are considered.

2. The method of claim 1, further comprising a content engine discerning activity levels of the at least one virtual machine.

3. The method of claim 1, wherein the at least one present allocation parameter comprises a memory usage, a storage usage, a network device usage and a central processing unit (CPU) usage.

4. The method of claim 1, further comprising a content parser identifying volumes with directory attributes and parsing for a last modified field to select candidate data files for migration.

5. The method of claim 1, further comprising:
   based on determining that the predefined virtual storage volumes are restricted from being analyzed, omitting the restricted storage volumes and corresponding paths from migration consideration.

6. The method of claim 1, further comprising:
   based on determining that the predefined virtual storage volumes are not restricted from being analyzed, migrating the storage volumes to the cloud storage server.

7. The method of claim 1, further comprising:
   identifying a change in data file inventory.

8. An apparatus comprising:
   a transmitter configured to transmit and establish an application programming interface (API) to an enterprise network; and
   a processor configured to identify at least one present allocation parameter being utilized by at least one virtual machine operating on the enterprise network;
   wherein the transmitter is configured to transmit a request for a directory file structure of the enterprise network and the processor is configured to determine whether predefined virtual storage volumes are restricted from being analyzed, identify at least one data file physically stored in the directory file structure and included within at least one predefined virtual storage volume for data migration to a remote cloud storage server based on predetermined criteria wherein the predetermined criteria is a present status of the predefined virtual storage volume,
   wherein the processor causes a classpath modifier component to configure a classpath broker to add a new path to a classpath environmental variable identifying location of the at least one data file after migration, and wherein when retrieval of the at least one migrated data file is requested, the processor inserts the file into a temporary path created within virtual storage;
   wherein a file list of potential candidate files is generated for the data migration to the cloud server and storing the file list in the database; and
   wherein the file list is accessed and additional data files to migrate to the cloud storage server are considered.

9. The apparatus of claim 8, wherein a content engine discerns activity levels of the at least one virtual machine.

10. The apparatus of claim 8, wherein the at least one present allocation parameter comprises a memory usage, a storage usage, a network device usage and a central processing unit (CPU) usage.

11. The apparatus of claim 8, wherein a content parser identifies volumes with directory attributes and parses for a last modified field to select candidate data files for migration.

12. The apparatus of claim 8, wherein the processor, based on a determination that the predefined virtual storage volumes are restricted from being analyzed, omits the restricted storage volumes and corresponding paths from migration consideration.

13. The apparatus of claim 8, wherein the processor, based on a determination that the predefined virtual storage volumes are not restricted from being analyzed, migrates the storage volumes to the cloud storage server.

14. The apparatus of claim 8, wherein the processor is further configured to identify a change in data file inventory.

15. A non-transitory computer readable storage medium configured to store instructions that when executed cause a processor to perform:
- establishing via a transmitter an application programming interface (API) connection to an enterprise network;
- identifying via a processor at least one present allocation parameter being utilized by at least one virtual machine operating on the enterprise network; and
- requesting via the transmitter a directory file structure of the enterprise network, determining whether predefined virtual storage volumes are restricted from being analyzed, and identifying via the processor at least one data file physically stored in the directory file structure and included within at least one predefined virtual storage volume for data migration to a remote cloud storage server based on predetermined criteria wherein the predetermined criteria is a present status of the predefined virtual storage volume,
- wherein the processor causes a classpath modifier component to configure a classpath broker to add a new path to a classpath environmental variable identifying location of the at least one data file after migration,
- wherein when retrieval of the at least one migrated data file is requested, the processor inserts the file into a temporary path created within virtual storage;
- wherein a file list of potential candidate files is generated for the data migration to the cloud server and storing the file list in the database; and
- wherein the file list is accessed and additional data files to migrate to the cloud storage server are considered.

16. The non-transitory computer readable storage medium of claim 15, wherein a content engine discerns activity levels of the at least one virtual machine.

17. The non-transitory computer readable storage medium of claim 15, wherein the at least one present allocation parameter comprises a memory usage, a storage usage, a network device usage and a central processing unit (CPU) usage.

18. The non-transitory computer readable storage medium of claim 15, wherein a content parser identifies volumes with directory attributes and parses for a last modified field to select candidate data files for migration.

19. The non-transitory computer readable storage medium of claim 15, wherein the processor is further configured to perform:
- based on determining that the predefined virtual storage volumes are restricted from being analyzed, omitting the restricted storage volumes and corresponding paths from migration consideration.

20. The non-transitory computer readable storage medium of claim 15, wherein the processor is further configured to perform:
- determining whether the predefined virtual storage volumes are restricted from being analyzed, and if not, then the storage volumes are migrated to the cloud storage server;
- identifying a change in data file inventory.

* * * * *